(12) United States Patent
de Hilster et al.

(10) Patent No.: US 6,996,561 B2
(45) Date of Patent: *Feb. 7, 2006

(54) SYSTEM AND METHOD FOR INTERACTIVELY ENTERING DATA INTO A DATABASE

(75) Inventors: David S. de Hilster, Long Beach, CA (US); Alan G. Porter, Huntington Beach, CA (US); John Reese, Los Angeles, CA (US)

(73) Assignee: BrassRing, LLC, Waltham, MA (US)

( * ) Notice: Subject to any disclaimer, the term of this patent is extended or adjusted under 35 U.S.C. 154(b) by 649 days.

This patent is subject to a terminal disclaimer.

(21) Appl. No.: 09/948,408

(22) Filed: Sep. 6, 2001

(65) Prior Publication Data

US 2002/0065830 A1 May 30, 2002

Related U.S. Application Data

(63) Continuation of application No. 09/456,930, filed on Dec. 7, 1999, now abandoned, which is a continuation-in-part of application No. 09/019,948, filed on Feb. 6, 1998, now Pat. No. 5,999,939.

(60) Provisional application No. 60/068,404, filed on Dec. 21, 1997.

(51) Int. Cl.
*G06F 17/30* (2006.01)

(52) U.S. Cl. .......................................... 707/6; 715/500
(58) Field of Classification Search ................ 707/102, 707/6; 715/430, 500
See application file for complete search history.

(56) References Cited

U.S. PATENT DOCUMENTS

| 5,164,899 A | 11/1992 | Sobotka et al. ................. 705/9 |
| 5,197,004 A | 3/1993 | Sobotka et al. ................. 705/8 |
| 5,315,504 A * | 5/1994 | Lemble ....................... 700/90 |

(Continued)

FOREIGN PATENT DOCUMENTS

| CA | 2277261 A | 9/1999 |
| WO | WO 95/24687 A1 | 9/1995 |
| WO | WO01/97086 A2 | 12/2001 |

OTHER PUBLICATIONS

Barchilon, "Technology's Impact on Online Resumes", IEEE, 1998, pp. 183–187.

(Continued)

*Primary Examiner*—Wayne Amsbury
(74) *Attorney, Agent, or Firm*—Lowrie, Lando & Anastasi, LLP (57) ABSTRACT

A system and method for facilitating the accurate entry of information into a highly structured database by initially extracting information from a plurality of nonuniformly formatted source data streams, e.g., documents/files, and subsequent interactions with users before storing the accepted and/or modified information into the database. Embodiments of the present invention provide an interactive path for each user (e.g., the author of the source document/file) to interactively modify the extracted data, e.g., according to the source document/file. Preferably, this interactive path is provided via the Internet and the extracted information can be modified by editing and/or selectively copying portions of the source documents/files to supplement and/or modify the extracted information.

36 Claims, 12 Drawing Sheets

U.S. PATENT DOCUMENTS

| | | | | |
|---|---|---|---|---|
| 5,361,355 A | * | 11/1994 | Kondo et al. | 717/120 |
| 5,379,420 A | * | 1/1995 | Ullner | 707/6 |
| 5,412,384 A | * | 5/1995 | Chang et al. | 341/79 |
| 5,550,967 A | | 8/1996 | Brewer et al. | |
| 5,604,900 A | | 2/1997 | Iwamoto et al. | |
| 5,608,904 A | * | 3/1997 | Chaudhuri et al. | 707/2 |
| 5,675,780 A | * | 10/1997 | Plant-Mason et al. | 707/6 |
| 5,721,827 A | | 2/1998 | Logan et al. | 709/217 |
| 5,732,216 A | | 3/1998 | Logan et al. | 709/217 |
| 5,740,425 A | | 4/1998 | Povilus | 707/100 |
| 5,758,126 A | * | 5/1998 | Daniels et al. | 715/780 |
| 5,758,324 A | * | 5/1998 | Hartman et al. | 705/1 |
| 5,806,057 A | | 9/1998 | Gormley et al. | 707/1 |
| 5,809,248 A | | 9/1998 | Vidovic | 709/219 |
| 5,819,301 A | * | 10/1998 | Rowe et al. | 715/513 |
| 5,832,496 A | | 11/1998 | Anand et al. | 707/102 |
| 5,832,497 A | * | 11/1998 | Taylor | 707/104.1 |
| 5,855,007 A | | 12/1998 | Jovicic et al. | 705/14 |
| 5,857,183 A | * | 1/1999 | Kableshkov | 707/3 |
| 5,907,837 A | | 5/1999 | Ferrel et al. | 707/3 |
| 5,973,696 A | * | 10/1999 | Agranat et al. | 715/760 |
| 5,999,939 A | | 12/1999 | de Hilster | 707/102 |
| 6,018,749 A | | 1/2000 | Rivette et al. | 707/505 |
| 6,044,382 A | * | 3/2000 | Martino | 715/505 |
| 6,047,296 A | * | 4/2000 | Wilmott et al. | 715/513 |
| 6,078,924 A | * | 6/2000 | Ainsbury et al. | 707/101 |
| 6,199,048 B1 | | 3/2001 | Hudetz et al. | |
| 6,202,023 B1 | | 3/2001 | Hancock et al. | |
| 6,233,618 B1 | | 5/2001 | Shannon | |
| 6,266,659 B1 | | 7/2001 | Nadkarni | |
| 6,321,228 B1 | | 11/2001 | Crandall et al. | |
| 6,785,679 B1 | | 8/2004 | Dane et al. | |
| 2004/0215623 A1 | | 10/2004 | Dane et al. | |

OTHER PUBLICATIONS

*Brassring Inc.* v. *Interactive Search Inc.*, Complaint, Civil Action No. 00CV11525JLT, filed Jul. 31, 2000 in the United States District Court for the District of Massachusetts, and a copy of the Docket relating thereto.

Chabrow, E.R., "Online employment (World Wide Web: job hunting and recruitment applications)," Information Week, Jan. 23, 1995, No. 511, pp. 38–41, 44–45.

Goth et al., "Scarcity of IT Workers is the Mother of Recruiter Innovations", IEEE, 1999, pp. 15–17.

Maltais, "Conducting a Job Search on the Internet", IEEE, 1997, pp. 131–133.

Romei, L.K., "Human Resource Management Keeps Computers Humming (job applications processing)," Managing Office Technology, Nov. 1994, vol. 39, No. 11, pp. 45.

Noah, William W. and Rollin V. Weeks, "TRW: Description of the Deft System as Used for MUC–5," pp. 237–248.

Noah, William W. and Rollin V. Weeks, *"TRW: Description of the Deft System as Used for MUC–5,"* pp. 237–248.

* cited by examiner

Fig. 1

EXPERIENCE: ⟋26

⟋24a ⟋24b ⟋24c ⟋24d
11/96 - 7/97 Relocation Assistance Coordinator
Tokyo Central Agency (TGA Inc.) Tokyo, Japan
Worked in a completely bilingual environment, involved in all aspects of Expatriate relocation. Conducted various orientations focusing particularly on life in Tokyo assistance in immigration and other official procedures, house hunting and school arrangements. Constantly required to use various skills in interpretation, translation, negotiation and cultural awareness.

Fig. 5 jobEngine — Post Resume
Help?

This page is for posting a new resume. Click here to Change or Remove a previously posted resume.

Instructions:

There are 3 steps to post your resume:

- Paste in your resume.
- Answer a few questions.
- Review our work to ensure that the information in your resume is correct. Then enroll.

And only a few rules: ⟋68

- Items labelled in Red are Required.
- Items labelled in Black are Optional, but we strrongly suggest that you take a few minutes to answer the questions. Your answers provide information, not typically found in a resume, that employers want to know before they contact you.

Don't worry -- nothing will be saved in the database without your review and approval.

STEP ONE -- PASTE IN YOUR RESUME

Copy your resume from a text file on your computer and paste into the text block below.

Be sure your contact information (name, address, phone number(s) and email address) appears only at the top of the resume, and that nothing in the body of your resume (like your current job description) identifies you. This protects your privacy. This step is Required.

Resume: ⟋70

```
Arthur Smith
1234 Main Street
Sausalito, California 94965
Tel: 415-555-5432    Fax: 415-555-5543
E-mail: asmith@isp.com

EXPERIENCE:

11/96 - 7/97 Relocation Assistance Coordinator
Tokyo Central Agency (TGA Inc.) Tokyo, Japan
```

[Ready for Step 2]  [Clear Form]

*Fig. 6A* jobEngine            Post Resume

Help?

STEP TWO -- ANSWER A FEW QUESTIONS

There's some additional information, not typically in your resume, that is very helpful to employers. Most of these questions are optional. However, you should try to answer as many as possible. It will only take a few minutes... promise.

/~72

Job Goals

Functional Specialties
```
GENERAL MANAGEMENT
  Senior Management (CEO Pres, COO, GM)
  Branch & Regional Management
INFORMATION TECHNOLOGY MANAGEMENT
```
— 82a Type of Position [Full Time] — 82b Expected Compensation [open] — 82c Travel [Moderate (25%-50%)] — 82d Relocation [Yes - I can relocate to:] Areas [most anywhere] — 82e    — 82f

About You

Citizenship [U.S. Citizen] — 82g

Current Clearances [No] — 82h

Enrollment — 82i

Type
- ⦿ Open - Your full resume, including contact information, will be available to employers.
- ○ Confidential - Your full resume, except your contact information, will be available to employers. Those interested in contacting you can do so via email forwarded to you confidentially.
- ○ Private - No employer can see your resume. It is retained in jobEngine's Resume Center as a convenience to you when applying to jobs.

[Ready for Step 3] [Start Over]

Comments, questions or suggestions? Please email us at support@jobEngine.com

—— A ZDNet and I-Search Site ——

Copyright (c) 1997 jointly by Ziff-Davis (ZDNet) and Interactive Search (I-Search). All rights reserved. jobEngine and "Matchmakers for IT Professionals" are joint service marks of Ziff-Davis and

*Fig. 6B* jobEngine

Post Resume

STEP 3 -- REVIEW INFORMATION AND ENROLL

We know you hate to enter again what you have already put into your resume. So, we've tried first to fin information we need. Please review the information carefully and correct errors. A copy of your resum included for copying and pasting as needed. This is an important step. Remember — items labeled in Re Required.

Be sure to scroll through all the data in this window, make all needed corrections, select a Resu Access Code and password, and then Post your resume.

Contact Information (confidential)

| Name | Arthur | | Smith | |
|---|---|---|---|---|
| Address | 1234 Main Street | | | |
| | | | | |
| City, State Zip | Sausalito | | California | |
| | 94965 | | | |
| Country | USA | | | |
| Phone | Home 415-555-5432 | Work | | Fax 415-555-55 |
| Email | asmith@isp.com | | | |
| Web Page | | | | |

Experience

Your three most recent positions. The order of jobs is not important. For each job entered, information is in each of the four columns with red labels.

| Start Date | End Date | Company | Title |
|---|---|---|---|
| 11/96 | 7/97 | TGA Inc. | Relocation Assistan |
| 3/95 | 10/96 | NCR English Language Inst | English Teacher |
| 8/94 | 2/95 | Los Angeles | Sales Associate |
| Year First Employed | 5/93 | | |

Education

Your three most recent degrees. For each degree entered, information is required in each of the two colu red labels. Information in the other columns is helpful.

| Year | Degree | School | Major |
|---|---|---|---|
| March, 1 | Bachelor of Ar | University of California | Speech Communications |
| | | | |
| | | | |

Fig. 6C (PART 1 OF 3)

Job Goals

Functional Specialties

Senior Management (CEO Pres, COO, GM)
Branch & Regional Management
INFORMATION TECHNOLOGY MANAGEMENT

Type of Position Full Time

Expected Compensation open

Travel Moderate (25%-50%)

Relocation Yes - I can relocate to:   Areas  most anywhere

About You

Citizenship U.S. Citizen

Current Clearances No

Please Help Us

We are curious about how you learned about jobEngine. Please help us by selecting one of the choices

Access Keys

Select an access code and password for future access to your resume.

Resume Access Code arthur

Password

Password (again)

Posting

Neither Ziff-Davis nor I-Search is responsible for the verification of data provided and shall not be liable for any errors, factual, transcript otherwise, contained in the information posted. Further, we assume no obligation with respect to the compliance of the information or a process with applicable governmental laws, rules and regulations of any kind regarding employment practices. With respect to confide Ziff-Davis and I-Search will use reasonable measures to delete the applicant's identity, but shall not be responsible for unintentional dis software malfunctions or exposures of applicant through descriptive information contained in the body of the resume.

[ I accept the agreement, post my resume ]

---

Your resume text for cutting and pasting information a
Back to Form

---

Processed by I-Search: 151-9000-5279

12'

Arthur Smith
1234 Main Street
Sausalito, California 94965
Tel: 415-555-5432   Fax: 415-555-5543
E-mail: asmith@isp.com

EXPERIENCE:

*Fig. 6C* (PART 2 OF 3)

11/96 - 7/97 Relocation Assistance Coordinator
Tokyo Central Agency (TGA Inc.) Tokyo, Japan
Worked in a completely bilingual environment, involved in all aspects of Expa
Conducted various orientations focusing particularly on life in Tokyo assista
other official procedures, house hunting and school arrangements. Constantly
skills in interpretation, translation, negotiation and cultural awareness.

3/95 - 10/96 English Teacher
NCR English Language Institute, Tokyo, Japan
Nova Inter cultural Institute, Tokyo, Japan
Experienced in all aspects of teaching English as a foreign language, includi
T.O.E.F.L. Actively participated in recruitment of new students, student lev
progress analysis. Voted Teacher of the Year by students and upper managemen 8/94 - 2/95 Sales Associate Nordstroms Los Angeles, CA
Consistently ranked as highest in customer sales and satisfaction in a compet
environment. Sharpened communicational skills and refined fashion sense gave
privilege of an honest and bright salesperson.

5/93 - 6/94 Resort Hotel Supervisor
Pacific Islands Club, Guam, U. S. A.
Thrived in a resort where the primary focus was to initiate guest interaction
department of sports, entertainment and activities. Assumed direct responsib
sports complex, training the constant influx of new employees, inventory and
introduction of inventive and efficient motivational techniques) and complete

EDUCATION:

Bachelor of Arts - Speech Communications
University of California at Santa Barbara
Graduation:    March, 1993

Major Courses of Study & Interest
Interpersonal Relations, Creative Writing, Psychology, Sociology CERTIFICATES: National Japanese Proficiency Exam - Level 2
  INTERESTS: Travel, Japanese, Scuba Diving, Tennis

{PGCNT}
{PAGE}

Comments, questions or suggestions? Please email us at support@jobEngine.com

—— A ZDNet and I-Search Site ——

Copyright (c) 1997 jointly by Ziff-Davis (ZDNet) and Interactive Search (I-Search) All rights reserved
jobEngine and "Matchmakers for IT Professionals" are joint service marks of Ziff-Davis and
Interactive Search.

Fig. 6C (PART 3 OF 3)

Arthur Smith
1234 Main Street
Sausalito, California 94965
Tel: 415-555-5432   Fax: 415-555-5543
E-mail: asmith@isp.com

/12

EXPERIENCE:

*11/96 - 7/97 Relocation Assistance Coordinator*
Tokyo Central Agency (TGA Inc.) Tokyo, Japan
Worked in a completely bilingual environment, involved in all aspects of Expatriate relocation. Conducted various orientations focusing particularly on life in Tokyo assistance in immigration and other official procedures, house hunting and school arrangements. Constantly required to use various skills in interpretation, translation, negotiation and cultural awareness.

*3/95 - 10/96 English Teacher*
NCR English Language Institute, Tokyo, Japan
Nova Inter cultural Institute, Tokyo, Japan
Experienced in all aspects of teaching English as a foreign language, including Phonics, and T.O.E.F.L. Actively participated in recruitment of new students, student level assessment and progress analysis. Voted Teacher of the Year by students and upper management.

*8/94 - 2/95 Sales Associate*
Nordstroms, Los Angeles, CA
Consistently ranked as highest in customer sales and satisfaction in a competitive retail environment. Sharpened communicational skills and refined fashion sense gave customers the privilege of an honest and bright salesperson.

*5/93 - 6/94 Resort Hotel Supervisor*
Pacific Islands Club, Guam, U S A.
Thrived in a resort where the primary focus was to initiate guest interaction in the unique department of sports, entertainment and activities. Assumed direct responsibility for managing the sports complex, training the constant influx of new employees, inventory and ordering of supplies, introduction of inventive and efficient motivational techniques) and complete area maintenance.

EDUCATION:

Bachelor of Arts - Speech Communications
University of California at Santa Barbara
Graduation: March, 1993

Major Courses of Study & Interest
Interpersonal Relations, Creative Writing, Psychology, Sociology CERTIFICATES:  National Japanese Proficiency Exam - Level 2

INTERESTS:  Travel, Japanese, Scuba Diving, Tennis

SYSTEM AND METHOD FOR INTERACTIVELY ENTERING DATA INTO A DATABASE

CROSS-REFERENCE TO RELATED APPLICATIONS

This application is a continuation of U.S. application Ser. No. 09/456,930, filed Dec. 7, 1999 now abandon, which is a continuation-in-part of U.S. Application Ser. No. 09/019,948, filed Feb. 6, 1998, now U.S. Pat. No. 5,999,939, which claims the benefit of U.S. Provisional Application No. 60/068,404, filed Dec. 21, 1997.

BACKGROUND OF THE INVENTION

The present invention relates to data processing systems for entering information into and accessing information from large structured databases and in particular to those systems which allow multiple independent users to enter information from nonuniformly formatted documents/files and to interact with the system to assure the accuracy of the database entries.

The use of databases for storing data records which can be readily searched is well known. A typical application of large structured databases would be a system for matching jobs and applicants. When used in conjunction with a search engine, a program that can search for matches between inquiry data and data stored within the database, such a system significantly reduces the manual efforts required to match the needs of employers (job providers) and applicants (job seekers). In order to enter applicant data into the database, source documents/files (typically, nonuniformly formatted resume) can be used. Since the format of text data contained within a resume is typically not standardized, text data extraction software is used to retrieve data for entry into the database. Typical of such data extraction software is that described in U.S. Pat. Nos. 5,164,899 and 5,197,004.

SUMMARY OF THE INVENTION

The present invention is directed to a system for facilitating the accurate transfer of information from a source data stream, e.g., a document/file, to a highly structured database and more particularly to such systems capable of accepting nonuniformly formatted documents, e.g., text documents such as resumes, advertisements, and medical records, from a plurality of users via a remote communication interface, e.g., the Internet, and for extracting information therefrom via a procedure which includes user participation to assure the transfer of appropriate entries into the database.

Embodiments of the present invention provide an interactive path for a user (typically, the author of the source document/file) to interactively modify the extracted information. In a preferred embodiment, this interactive path is provided via the Internet and the extracted information can be altered by editing and/or selectively copying portions of the source document/file to supplement and/or modify the extracted information.

A preferred system for facilitating the accurate transfer of information from each of a plurality of nonuniformly formatted source data streams into a structured database comprises (1) means for supplying digital data representing each of a plurality of source data streams from a plurality of users, each source data stream containing data corresponding to multiple discernible source data strings, (2) data extraction means for extracting selected ones of the source data strings and generating related target data strings, (3) means for displaying a structured form comprised of multiple fields, each field capable of accommodating a data string and wherein one or more of the fields have the target data strings inserted within, (4) means for enabling each user to modify the target strings inserted within the displayed form corresponding to the source data stream originating from the user before accepting the form, and (5) means for storing data corresponding to the data strings from the form fields into the database.

In a further aspect of the present invention, the providing means uses a remote communication interface, preferably using the Internet, to supply the source document/file to the data extraction means and, subsequently, to return the form having target data strings within its fields.

An additional embodiment of the present invention also comprises a means for providing one or more supplemental inquiry forms to a user, receiving data strings in response to the supplemental inquiry forms, and for providing the data strings back to the user along with the target data strings in a structured form.

In a further aspect of the present invention, the providing means enables a user to submit digital data in the form of an audio stream. Data processing includes the conversion of the audio stream to a text string. The text string is then processed in the same manner as a user submitted source string containing text.

In an alternative embodiment of the present invention, the providing means uses traditional mail to supply the source document/file to the data extraction means. Alternatively, the data extraction means, structured form generating means, supplemental inquiry form generator, and structured form editing means are supplied to the user's computer as a self executing piece of software.

The novel features of the invention are set forth with particularity in the appended claims. The invention will be best understood from the following description when read in conjunction with the accompanying drawings.

BRIEF DESCRIPTION OF THE DRAWINGS

FIG. 7 shows an exemplary resume used in conjunction with the forms of FIGS. 6A–6C.

DESCRIPTION OF THE PREFERRED EMBODIMENTS

The present invention is directed to a system for facilitating the accurate transfer of information from a source data stream, e.g., a document/file, to a highly structured database and more particularly to such systems capable of accepting nonuniformly formatted documents, e.g., text documents such as resumes, from a plurality of users via a remote communication interface, e.g., the Internet, and for extracting information therefrom via a procedure which includes user participation to assure the transfer of appropriate entries into the database.

In a preferred embodiment of the present invention, the system is used to place nonuniformly formatted advertisements into a structured database. In an additional embodiment of the present invention, the system is used to place nonuniformly formatted medical records into a structured database.

Embodiments of the present invention provide an interactive path for a user (typically, the author of the source document/file) to interactively modify the extracted information, e.g., according to the source document/file. In a preferred embodiment, this interactive path is provided via the Internet and the extracted information can be altered by editing and/or selectively copying portions of the source document/file to supplement and/or modify the extracted information.

Figure 1:
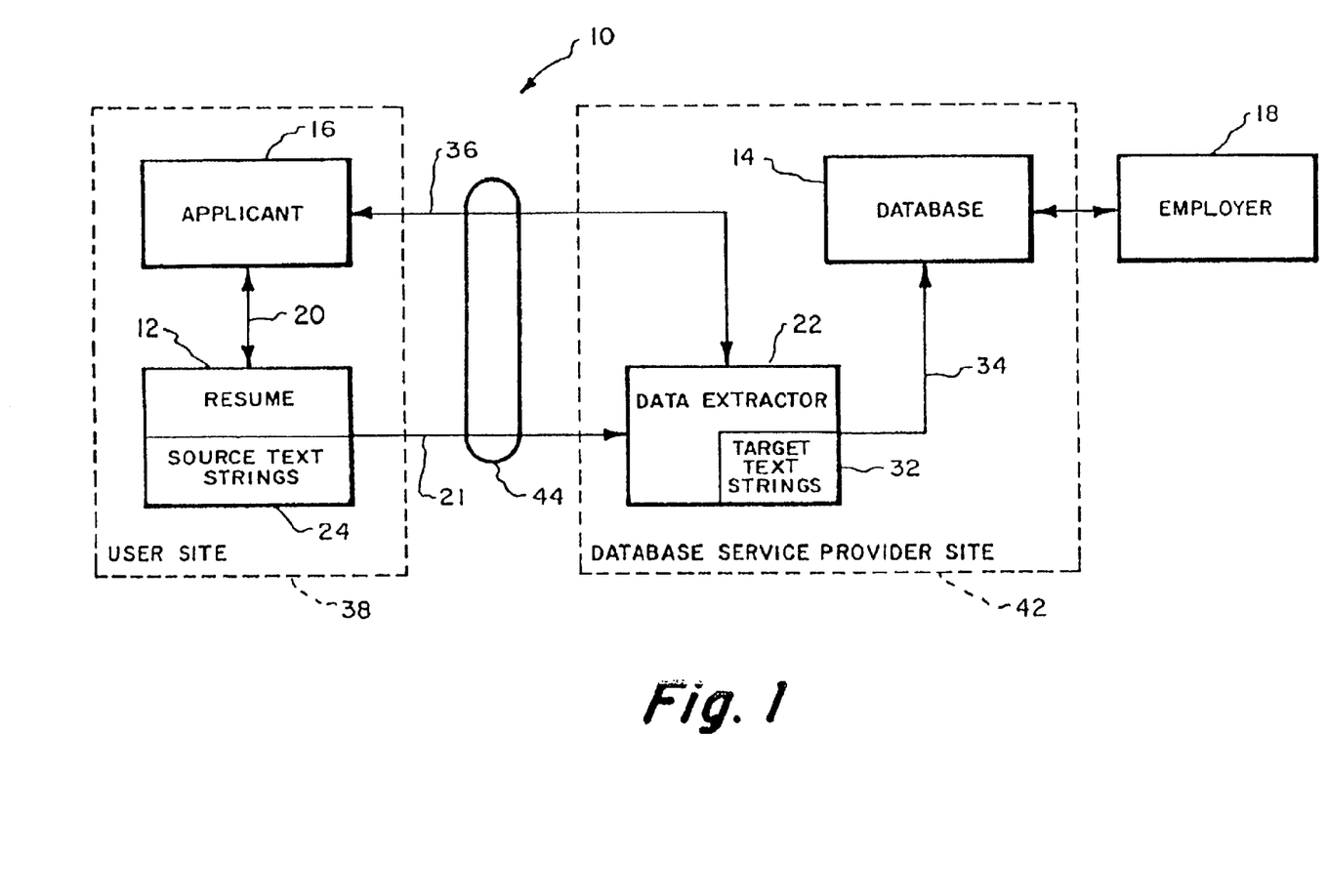
FIG. 1 comprises a simplified block diagram of a system for entering resume data into a database and interactively modifying and/or supplementing such entered data.

FIG. 1 comprises a simplified block diagram of a system 10 for entering data from a source data stream 12, e.g., a text document/file such as a resume, into a database 14 and interactively modifying and/or supplementing such entered data. In an exemplary job search environment, the interactive system 10 provides an improved system and method for accurately transferring information from resume source document/file 12, hereinafter referred to as resumes and preferably independently generated by a plurality of applicants 16, to the database 14 where it is accessible (preferably via a search engine as described further below) to one or more employers 18. Resumes are preferably used as the source documents/files 12 in this environment since resumes are a well-accepted tool for providing information from an applicant to an employer and, as such, they typically already exist.

Figure 2:
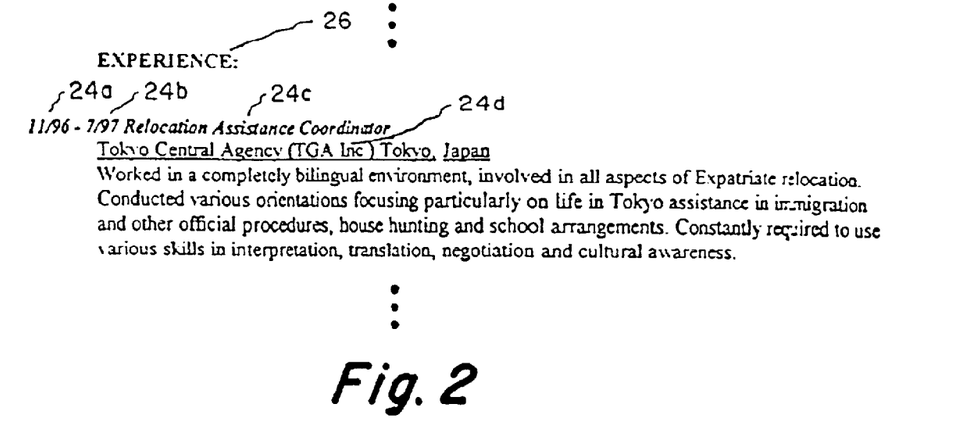
FIG. 2 is a portion of the exemplary resume of FIG. 7, showing the extraction of source text strings based on the syntax of surrounding text.

As shown in FIG. 1, the resume 12 is typically generated via path 20 using a word processor (not shown). Interactions between the applicant 16 and resume 12 typically continue via the word processor until a satisfactory resume 12 is generated and stored as corresponding digital data. However, resumes are generally nonstructured or loosely structured (and nonuniformly formatted between users) text documents that are only intended to be human readable e.g., by the employer 18 and the applicant 16, and are typically not directly useable in the highly structured database 14. Consequently, the resume 12 is supplied via path 21 to a data extractor 22, preferably implemented as text data extraction software (e.g., the DEFT software developed by TRW as part of their InfoWeb™ system), to selectively convert information from the format of the unstructured (or loosely structured) resume 12 to the format of the highly structured database 14. Essentially as shown in FIG. 2 (a portion of the exemplary resume of FIG. 7), the data extractor 22 isolates one or more discernible source data strings, e.g., text data strings 24, within the resume 12 and, according to the content of the source data strings, e.g., 24a–24z, and using the syntax of surrounding keyword data, e.g., text strings 26, determines a correlation between source text strings 24 and data fields 28 that are to be entered into the database 14. For example, the keyword text string 26 ("EXPERIENCE") identifies the following source text strings 24 as being related to the applicant's job experience due to the syntax of the surrounding text, e.g., the keyword "experience", the existence of dates, the identification of a company (Inc.), etc.

Figure 3:
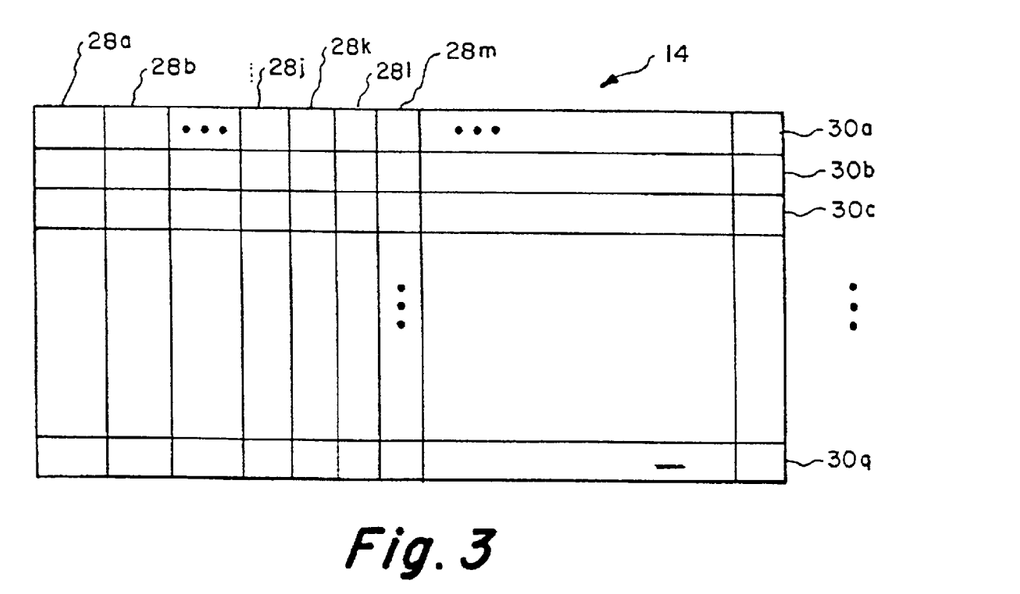
FIG. 3 is a diagram of the structure of an exemplary database comprised of a plurality of applicant data records.

As shown in FIG. 3, an exemplary applicant database 14 is comprised of a plurality of fixed length records 30, each corresponding to a different one of a plurality of applicants 16. Each record 30 is comprised of a plurality of data fields 28 having predefined formats and lengths, corresponding to searchable pieces of information.

Table I shows an exemplary partial list of definitions of the information stored in the data fields 28 of the database 14 of FIG. 3.

TABLE I

| Data Field | Definition |
| --- | --- |
| 28j | Most recent job start date |
| 28k | Most recent job end date |
| 28l | Most recent job company |
| 28m | Most recent job title |
| 28n | Next job start date |
| 28o | Next job end date |
| 28p | Next job company |
| 28q | Next job title |

First, the data extractor 22 extracts source data strings, e.g., text strings 24a–2d, from the resume 12. Optionally, the text format of one or more of the source text strings 24 are then altered by the data extractor 22 to generate target data strings, e.g., text strings 32, of a standardized format. For example, a date text string could be standardized (e.g, Mar. 12, 1993 could be changed to 3/12/93). Otherwise, the stored target text string 32 is essentially identical to the source text string 24. As described further below, each target text string 32 preferably directly corresponds to the data fields 28 in the database 14 (e.g., the target string 32 corresponding to source text string 24a corresponds to 28j) and thus, following the modification/acceptance process described below, target text strings 32 are stored via path 34 into the database 14 (following any conversions required by the format of the database 14 and its fields 28).

However, due to lack of structure of the resume 12, the data extractor 22 (also referred to as a natural language processor) is susceptible to making an incomplete or erroneous correlations. Accordingly, the present invention provides an interactive path 36 that enables the applicant 16, generally the individual most acquainted with the contents of the resume 12, to modify the target text strings 32 to best correspond to the resume 12 and, thus, enhance the accuracy of the data stored in the database 14.

Figure 4:
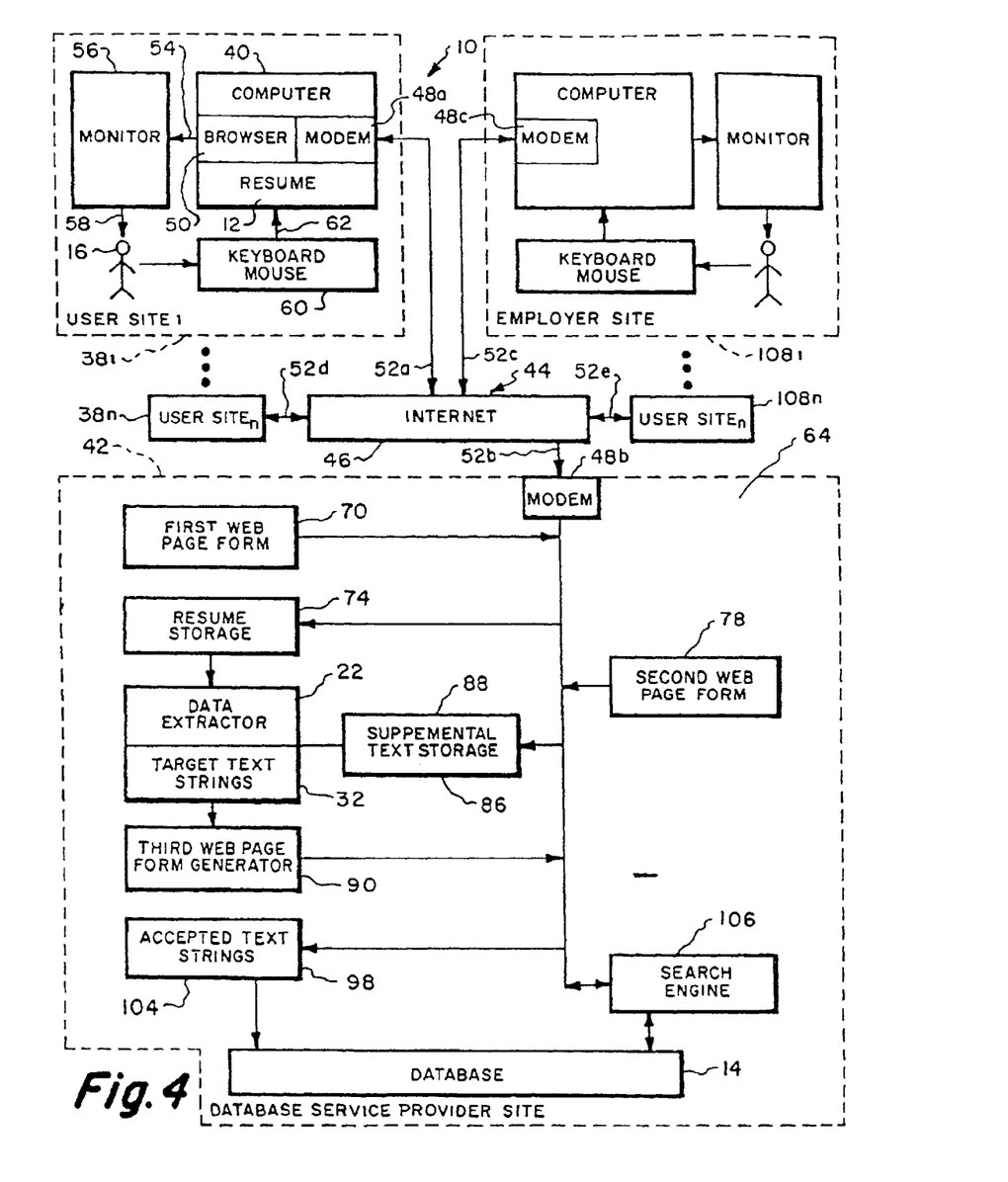
FIG. 4 comprises an expanded block diagram of the flow of the data entry system of FIG. 1.

FIG. 4 is an expanded block diagram of the system 10 of FIG. 1 showing the data flow which enables each user (i.e., applicant 16 in this exemplary environment) to interact with the information extracted by the data extractor 22 and thus assure the accurate transfer of information from the resume 12 into the structured database 14. The interactive system 10 is preferably comprised of one or more user sites 38 (including a computer 40 operated by the applicant 16) and a database service provider site 42 (generally an automated service) coupled to each other via a remote communication interface 44. In the following discussion, the remote communication interface comprises the Internet 46, the associated hardware and/or software at the user 38 and database service provider 42 sites, typically comprising a modem 48 and a web (Internet) browser 50, and the associated interconnections 52 between (typically phone lines and Internet Service Providers (ISPs)). However, other communication interfaces, e.g., a local area network (LAN) or a direct modem to modem or serial port to serial port connections, are also considered to be alternative remote communication interfaces.

Preferably, each user site 38 is comprised of the computer 40, e.g., a personal computer, having a display control output 54 that drives a display monitor 56 to generate a displayed output 58 and a data entry device, e.g., a keyboard/mouse 60, that directs operation of the computer 40 via control path 62. In contrast, while the database service provider site 42 may typically also include a monitor and a keyboard/mouse, it only requires a computer 64 that interfaces to the Internet 46.

Figure 5:
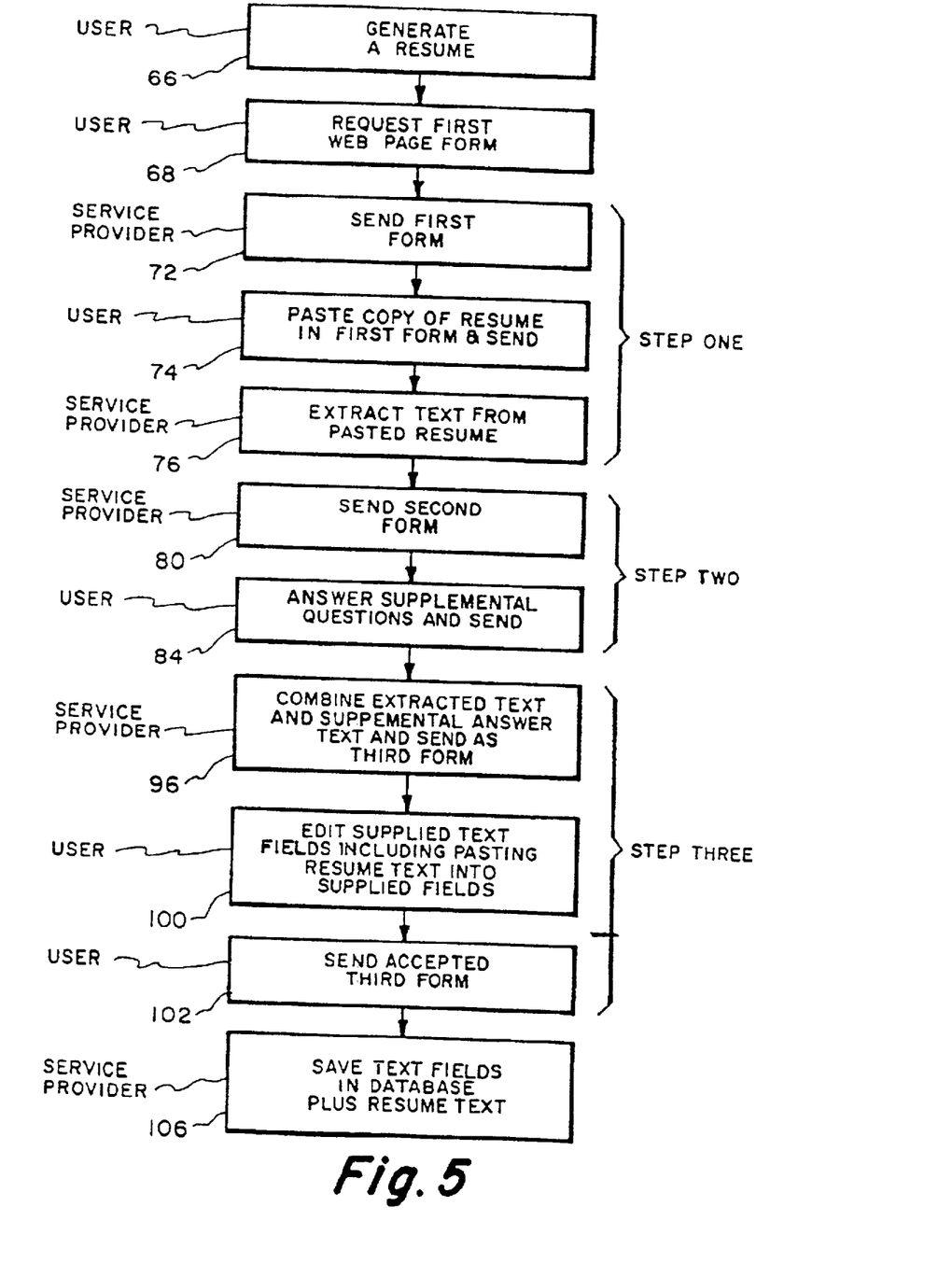
FIG. 5 comprises a simplified flow chart of the data entry flow of FIG. 4.

Initially, the user 16 at user site 38 generates the source document/file, i.e., resume 12, at step 66 of FIG. 5. As previously discussed, this generation is interactive and proceeds until user 16 is satisfied with the results. However, the resulting resume 12 is generally unstructured relative to the highly structured form of the database 14.

Figure 6A:
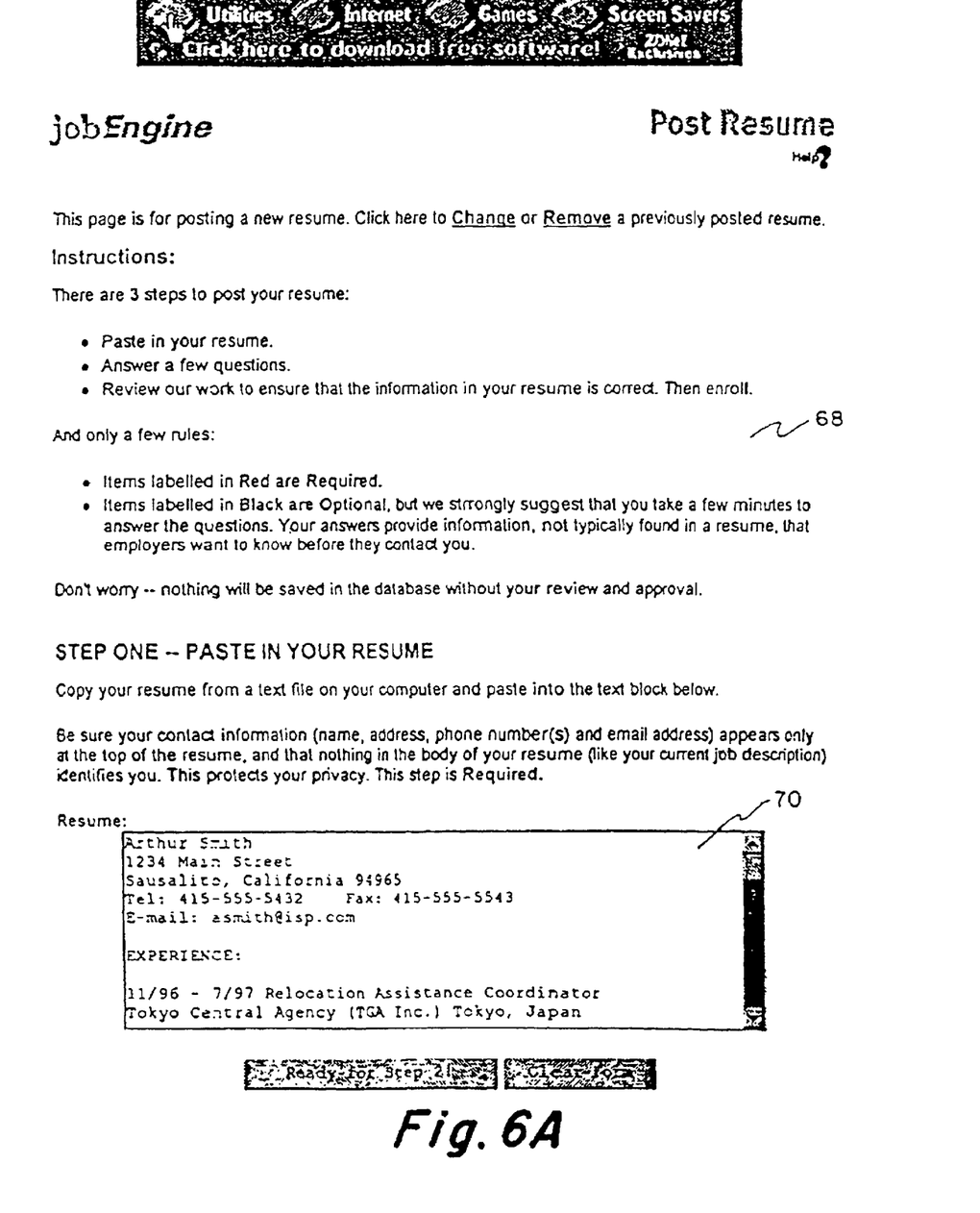
FIGS. 6A–6C show exemplary forms for providing resume and/or supplementary data to the database service provider of FIG. 1.

As a next step, the user 16 requests a first web page form (step 68) via the Internet 46 to begin the process of interactively transferring the resume 12 to the database 14. The first web page form 68 (see FIG. 6A) is stored (see block 70) within computer 64 at the database service provider site 42 and is responsively provided back (see step 72) to the user site 38 via the Internet 46 (commencing STEP ONE) and displayed by the web browser 50 on the monitor 56. The user 16 then preferably provides the existing resume 12 back to the database service provider site 42 via a pasting operation used in conjunction with the web browser 50. In an exemplary Windows 95 environment, the user 16 launches the word processor, e.g., Microsoft Word, that had been used to generate the resume 12. Preferably, the user 16 then selects the entire resume document and copies it to the clipboard. Next, the user 16 pastes the resume 12 from the clipboard into a source data input field 70 of the first web page form 68 using the web browser 50, e.g., Microsoft Internet Explorer. Typically, this pasting removes any word processor formatting information and results in digital data (preferably formatted as ASCII text) representing the resume 12 being stored in the web browser 50. (Alternatively, the word processor formatting information can be extracted by the data extractor 22.) The web browser 50 is then used to send (see step 74) the first web page form 68 (now containing the resume 12) to the database service provider site 42 where the resume 12 is stored in resume storage 74. The data extractor 22 then extracts one or more source text strings 24 according to syntactical rules to establish a correspondence between the source text strings 24 (preferably saved as intermediary target text strings 32) and fields 28 of the database 14.

Figure 6B:
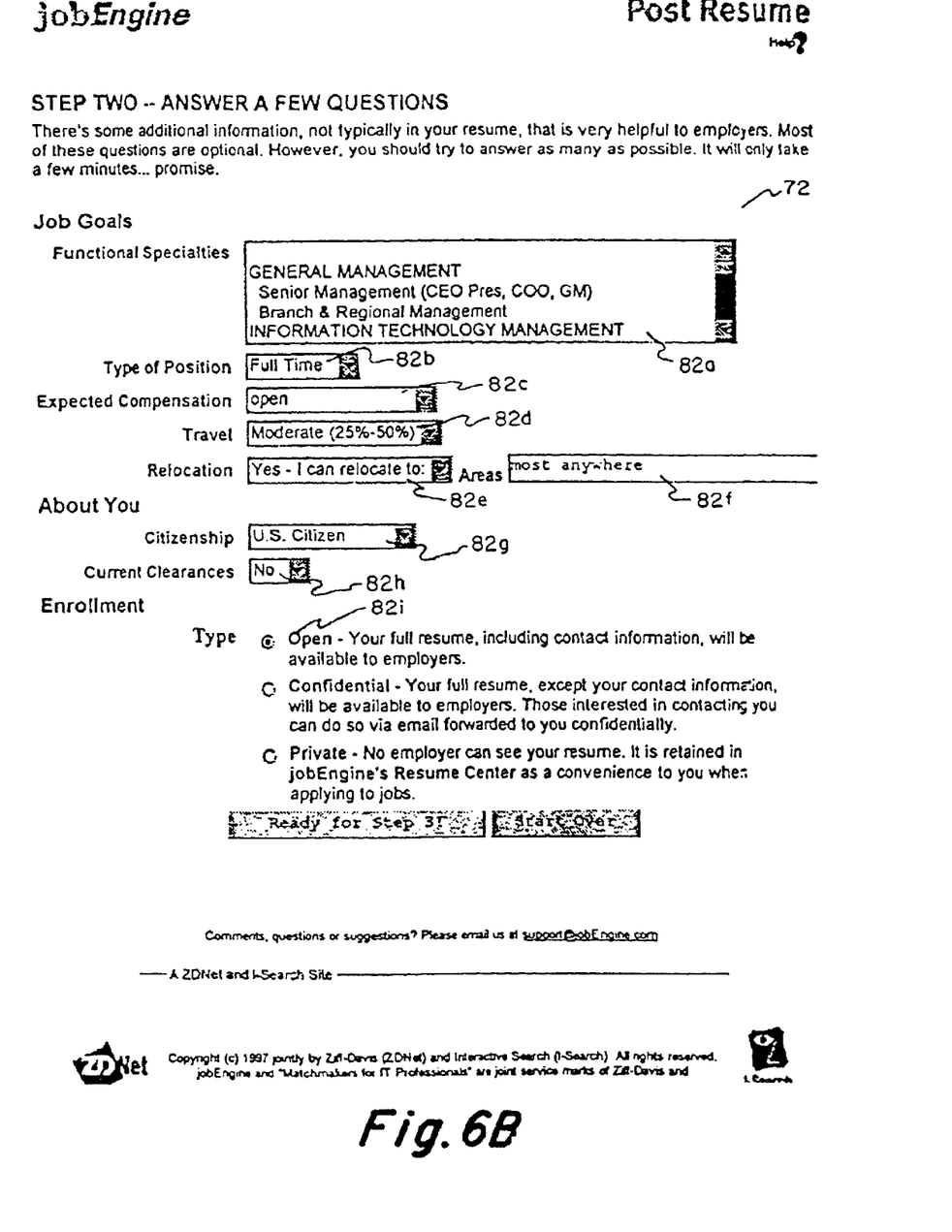

Next, STEP TWO of the process commences by the computer 64 at the database service provider site 42 sending a second web page form 78 (see FIG. 6B) at step 80 which is displayed via the web browser 50 on the monitor 56 at the user site 38. In this example, the second web page form 78 is a supplemental inquiry form, that asks the user 16 one or more supplemental questions. In response, the user 16 fills in supplemental fields 82, e.g., by a pull-down field, free text entry, a radio selection, etc. This filled-in form is sent back to the database service provider 42 in step 84 where supplemental text strings 86 are stored in supplemental text storage 88.

STEP THREE of the process commences by the third web page form generator 90 at the database service provider site 42 generating a third web page form 92 (see FIG. 6C), a structured form having multiple fields 94 each field being capable of accommodating a text string within. Specifically, target text strings 32 (corresponding to source text strings 24) are inserted within fields 94 according to the syntax of the source document/file 12 and the definition (e.g., name, address, city, etc.) of each field 94. Additionally, the supplemental text strings 86 are inserted within the associated fields 94 of form 92. Preferably, the stored resume 12' from resume storage 74 is also added to the third web page form 92. Finally, the third web page form 92 is sent back in step 96 to the user site 38 where it is displayed by the web browser 50 on monitor 56.

Figure 6C:
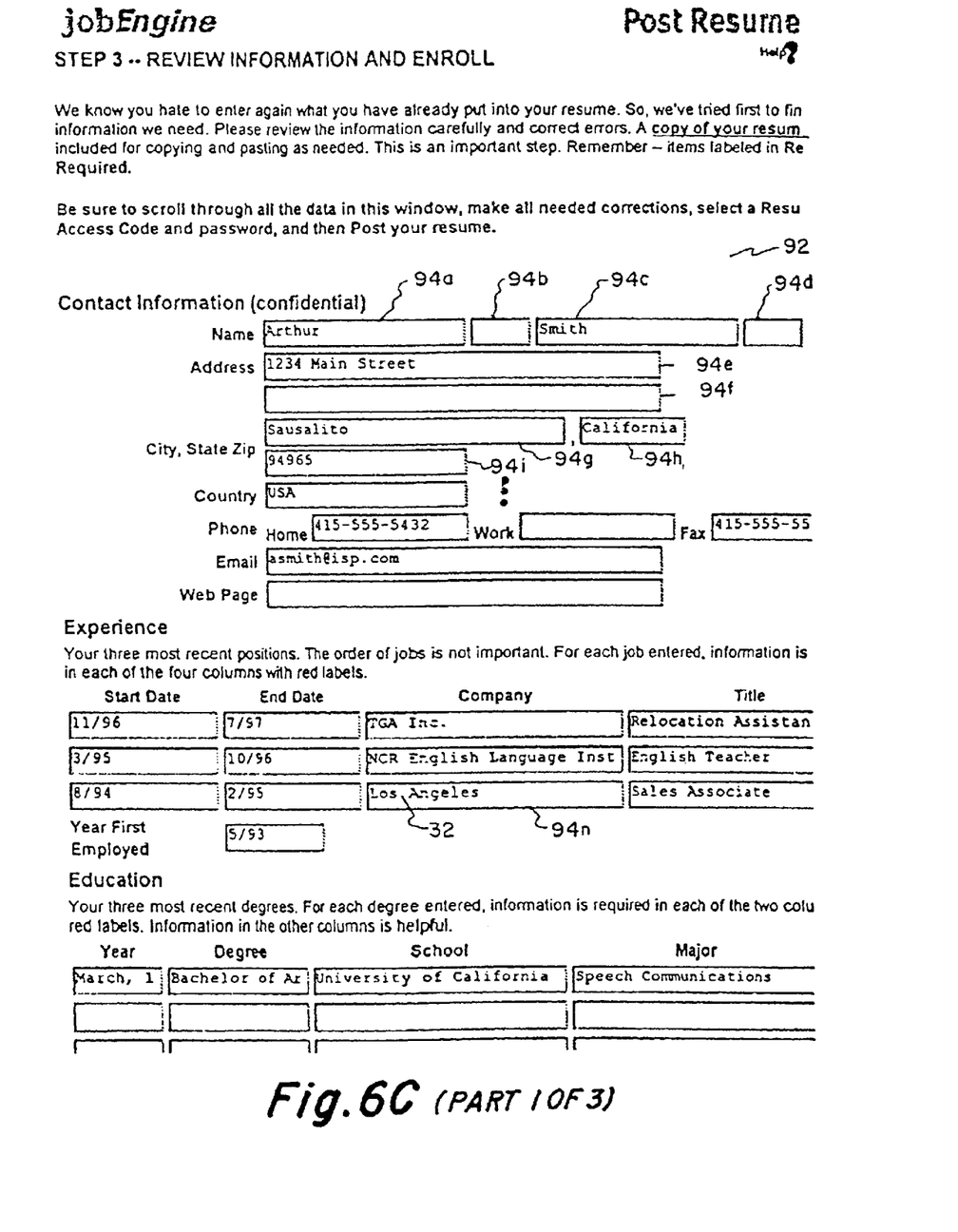

The user 16 can now use the view the displayed form 92 to determine its accuracy. If the displayed data, including target text strings 32 and supplemental text strings 86, are accurate the user 16 sends back form 92 to the database service provider site 42 where the accepted text strings are extracted in block 98 and stored in database 14. However, as previously discussed, the displayed data is not always accurate. Accordingly, the user 16 can edit data supplied in the third web page form 92 (preferably including using the supplied resume 12) to cause the fields 94 of form 92 to more accurately represent the applicant's resume information. Using features of the web browser 50, the user 16 can in step 100 edit fields 94 and/or paste information from resume 12' (now part of form 92) to modify the data fields 94. The user in step 102 then sends the modified form 92 back to the database service provider site 42 where accepted text strings 104 from fields 94 are stored in the database 14 in step 98.

As an example of the modification process, it is noted that field 94n corresponding to the third "Company" under "Experience" has been filled in with the target text string 32 "Los Angeles". This is inaccurate since the data extractor 22 has apparently missed the company name, i.e., Nordstroms, and instead extracted the city name as the target text string 32. Therefore, the user/applicant 16 can identify this inaccuracy and either (1) edit the field 94n by typing in the correct entry or (2) select the source text string 24' from the copy 12' of resume 12 included on the third web page form and paste the proper text (Nordstroms) into field 94n. Accordingly, the user/applicant 16 has been given the opportunity to verify and correct the data before entering it into the database 14, thus assuring the accurate transfer of information into the database 14.

Once the information has been stored in the database 14, a search engine 106, preferably a software program that executes on the computer 64 at the database service provider site 42, can be used to match inquiries, e.g., from one or more employer sites 108 (preferably via the remote communication interface 44) to look for applicants 16 with specific attributes. For example, since the highly structured database 14 contains fields 28 corresponding to the schools attended by each applicant 16, the search engine 106 can, in response to a request from the employer site 108, search for applicants 16 who graduated from specific schools or any other criteria stored in the fields 28 of the database 14.

In another embodiment of the current invention, the user 16 at user site 38 generates an audio file to be used as the source file, i.e., resume 12, at step 66 of FIG. 5. The ability to submit an audio file may be particularly helpful to those who have difficulty typing or who prefer to dictate. The user 16 proceeds through the same series of steps as previously described, except that instead of cutting and pasting resume text from some type of word processor into the first web page form 68, the user 16 attaches the audio file via an attachment operation in conjunction with the web browser 50. The user 16 then uses the web browser 50 to send the first web page form 68 (now containing the resume 12 as an audio file) to the database service provider site 42 where the audio file is stored in resume storage 74.

Once received by the database service provider site 42 a speech to text conversion program is used to convert the audio file attached to first web page form 68 into a text file 12. The text file 12 is also stored in resume storage 74. The text file is then used the same way a user generated text file 12 is used as described above to generate an entry in database 14.

Figure 8:
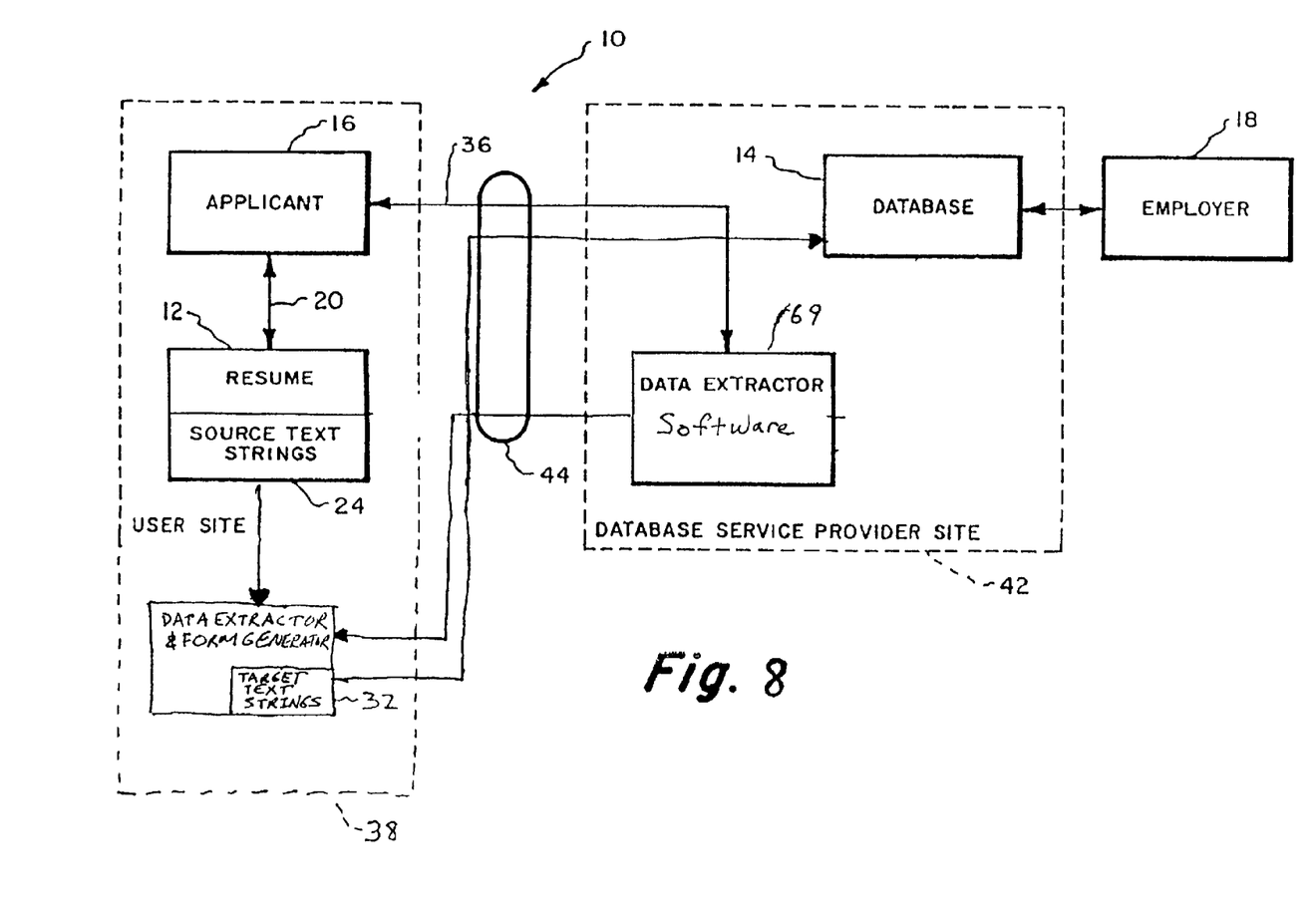
FIG. 8 comprises a simplified block diagram of a system for entering resume data into a database and interactively modifying and/or supplementing such entered data using software stored on a user's computer.

In another embodiment of the invention (see FIG. 8) the text extractor, supplemental question page generator, structured form generator, and structured form editor is supplied to the user's computer 40 as an applet or other self executing piece of software 69 by the database service provider. A speech to text conversion program may also be supplied to the user's computer 40. The provision of the software 69 may be done through a remote communication interface, such as the Internet. The applet or software 69 may use a web browser as an interface or it may have its own independent user interface.

Figure 9:
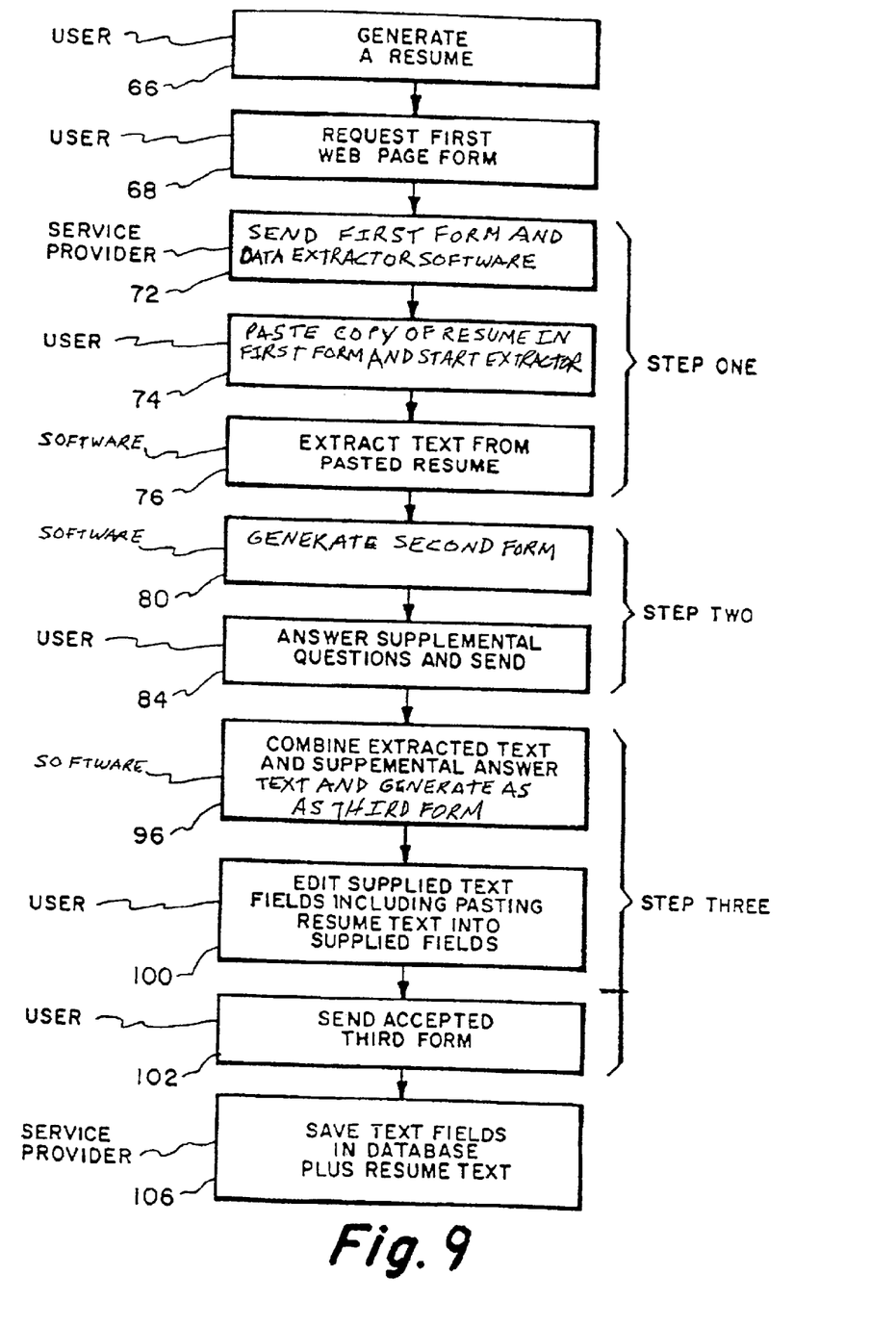
FIG. 9 comprises a flow chart of the data entry system of FIG. 8.

Initially, the user 16 at user site 38 generates the source document/file, i.e., resume 12, at step 66 of FIG. 9. As previously discussed, this generation is interactive and proceeds until user 16 is satisfied with the results. In this embodiment however, the resume generation process can either be carried out using another word processor or through the supplied software 69 itself.

As a next step, the user 16 requests a first web page form and the associated software 69 (step 68) via the Internet 46 to begin the process of interactively transferring the resume 12 to the database 14. The first web page form 68 (see FIG. 6A) and the associated software 69 is stored (see block 70) within computer 64 at the database service provider site 42, and is responsively provided back (see step 72) to the user site 38 via the Internet 46 (commencing STEP ONE), and displayed by the web browser 50 on the monitor 56.

The user 16 then preferably provides the existing resume 12 into the software 69 either by entering it directly or via a pasting operation used in conjunction with the web browser 50.

Next, STEP TWO of the process commences by the software on the users computer 40 which generates a second form 78 (see FIG. 6B) at step 80 which is displayed on the monitor 56 at the user site 38. In this example, the second form 78 is a supplemental inquiry form, that asks the user 16 one or more supplemental questions. The number of supplemental questions can vary depending on the contents of the resume 12. In response, the user 16 fills in supplemental fields 82, e.g., by a pull-down field, free text entry, a radio selection, etc. This filled-in form is submitted to the software 69 in step 84 where the supplemental text strings 86 are stored by the software 69 to some type of recordable media as supplemental text storage 88.

STEP THREE of the process commences by the software 69 on the user's computer 40 generating a third form 92 (see FIG. 6C), a structured form having multiple fields 94, each field being capable of accommodating a text string within. Specifically, target text strings 32 (corresponding to source text strings 24) are inserted within fields 94 according to the syntax of the source document/file 12 and the definition (e.g., name, address, city, etc.) of each field 94. Additionally, the supplemental text strings 86 are inserted within the associated fields 94 of form 92. Preferably, the stored resume 12' from resume storage 74 is also added to the third form 92. The third web page form 92 is displayed by the web browser 50 on monitor 56.

The user 16 can now use the software 69 to view the displayed form 92 to determine its accuracy. If the displayed data, including target text strings 32 and supplemental text strings 86 are accurate, the user 16 sends back form 92 using the software to the database service provider site 42 via the Internet, where the accepted text strings are extracted in block 98 and stored in database 14. However, as previously discussed, the displayed data is not always accurate. Accordingly, the user 16 can edit data supplied in the third form 92 (preferably including using the supplied resume 12) to cause the fields 94 of form 92 to more accurately represent the applicant's resume information. Using features of the web browser 50, the user 16 can in step 100 edit fields 94 and/or paste information from resume 12' (now part of form 92) to modify the data fields 94. The user in step 102 then uses their browser to send the modified form 92 back to the database service provider site 42 using the software where accepted text strings 104 from fields 94 are stored in the database 14 in step 98.

In another embodiment of the invention the text extractor, structured form generator, supplemental question page generator, and structured form editor is supplied to the user's computer as self executing piece of software 69 by the database service provider. In this embodiment the user would not need to have an Internet connection at all. The user contacts the database service provider using for example e-mail, telephone or traditional mail requesting the software 69. The software 69 is sent to the user on portable storage media through traditional mail and is executable as a stand alone program on the user's computer 40.

The functionality is similar to the above embodiments except that once the process is complete the user is prompted to save the completed resume 12 to portable storage media. The user then sends the storage media to the database service provider using traditional mail. Once received, the database service provider takes the resume 12 off of the portable storage media and places the resume contents into the database 14.

Although the present invention has been described in detail with reference only to the presently-preferred embodiments, those of ordinary skill in the art will appreciate that various modifications can be made without departing from the invention. For example, while a job search environment has been primarily described, the present invention can be useful in other environments where the source document is essentially unstructured relative to a highly structured database. Accordingly, the invention is defined by the following claims.

What is claimed is:

1. A method for facilitating the accurate transfer of information to a structured database, said method comprising the steps of:

receiving digital data from one or more users representing one or more nonuniformly formatted source data streams, each said source data stream containing digital data corresponding to one or more discernible source data strings, wherein said digital data includes first digital data that is personal information about a first user;

extracting selected ones of said source data strings from said source data streams and generating related target data strings;

sending a structured form to said first user comprised of multiple fields, each field being capable of accommodating a data string and wherein any said generated target data strings are inserted;

enabling said first user to modify and/or accept said target data strings inserted within said structured form;

receiving digital data from said first user corresponding to said target data strings from said structured form fields; and storing said digital data corresponding to said target data strings from said structured form fields in said database.

2. The method of claim 1 wherein said sending and receiving steps use a remote communication interface.

3. The method of claim 2 wherein said remote communication interface uses the Internet.

4. The method of claim 1 wherein said structured form additionally comprises said source data stream and said enabling step includes enabling said first user to copy selected portions of said source data stream into selected fields of said structured form.

5. The method of claim 1 wherein one or more of said target strings are essentially equivalent to said extracted source data strings.

6. The method of claim 1 additionally comprising the step of: receiving one or more supplemental data strings in response to one or more supplemental inquiry forms; and wherein said structured form additionally comprises fields having said supplemental data strings inserted within.

7. A system for facilitating the accurate transfer of information to a structured database, said system comprising:

means for receiving digital data from one or more users representing one or more nonuniformly formatted source data streams, each said source data stream containing data corresponding to one or more discernible source data strings, the said digital data including at least first digital data generated by and received from a first user;

data extraction means for extracting selected ones of said source data strings from said source data streams and generating related target data strings;

means for generating a structured form comprised of multiple fields, each field capable of accommodating a data string and wherein any said generated target data strings are inserted;

means for sending said structured form to said first user;

means for enabling said first user to modify said target data strings inserted within said structured form;

means for receiving digital data corresponding to said target data strings from said structured form fields; and means for storing data corresponding to said target data strings from said structured form fields in said database.

8. The system of claim 7 wherein said means for receiving said digital data comprises each said user sending said digital data via a remote communication interface.

9. The system of claim 8 wherein said remote communication interface uses the Internet.

10. The system of claim 7 wherein said means for sending said structured form additionally comprises means for returning said structured form via a remote communication interface.

11. The system of claim 10 wherein said remote communication interface uses the Internet.

12. The system of claim 7 wherein said means for enabling includes means for enabling each said user to copy selected portions of said source data stream into selected fields of said structured form.

13. The system of claim 7 wherein one or more of said target strings are essentially equivalent to said extracted source data strings.

14. The system of claim 7 additionally comprising:

means for receiving one or more supplemental data strings in response to a supplemental inquiry form; and wherein said structured form additionally comprises fields having said supplemental data strings inserted within.

15. A system for facilitating the transfer of information, said system comprising:

a communication interface for receiving from each of one or more user sites one or more nonuniformly formatted source data streams, each containing data corresponding to discernible source data strings received from a respective user who generated a respective source data stream;

a data extractor for extracting selected source data strings from said source data streams and generating related target data strings and for returning said target data strings to said user sites;

a generating apparatus for generating a structured form comprised of multiple fields, each field capable of accommodating a data string and wherein one or more of said fields have said target data strings inserted within;

a data entry apparatus for enabling each respective user to alter said fields of said structured form corresponding to said respective source data stream originating from said respective user before accepting said structured form; and a database for storing data corresponding to said data strings from said structured form fields.

16. The system of claim 15 wherein said communication interface uses the Internet.

17. The system of claim 15 wherein said structured form comprises said respective source data stream and said data entry apparatus enables said respective user to copy selected portions of said respective source data stream into selected fields of said structured form.

18. The system of claim 17 wherein said data extraction apparatus additionally returns said respective source data stream to its corresponding user who generated said respective source data stream.

19. The system of claim 15 wherein one or more of said target data strings are essentially equivalent to said extracted source data strings.

20. The system of claim 15 additionally comprising:

means for receiving one or more supplemental data strings in response to one or more supplemental inquiry forms; and wherein said structured form additionally comprises fields having said supplemental data strings inserted within.

21. A method for facilitating the accurate transfer of resume information from a nonuniformly formatted source data stream to a structured database, said method comprising the steps of:

receiving a digital representation of a resume from a first job applicant;

extracting data strings from said digital representation and generating related target data strings;

sending at least a portion of said target data strings to said first job applicant; and enabling said first job applicant to modify said target data strings to create modified data strings;

receiving said modified data strings from said first job applicant; and storing said modified data strings in the database.

22. The method of claim 21, wherein the sending and receiving steps use a remote communication interface.

23. The method of claim 22, wherein the remote communication interface uses the internet.

24. The method of claim 21, wherein said target data strings are inserted into a structured form.

25. The method of claim 24, wherein the step of enabling includes a step of enabling said first job applicant to modify the said target data strings that are inserted into the structured form.

26. The method of claim 24, wherein the structured form includes multiple fields, each field being capable of accommodating at least one of said target data strings.

27. The method of claim 24, further comprising the step of enabling said first job applicant to accept said target data strings that are inserted into the structured form.

28. The method of claim 21, further comprising the step of enabling said first job applicant to accept said target data strings.

29. A method of transferring information from nonuniformly formatted source data streams to a structured database, said method comprising the steps of:

receiving digital data from at least one user, the data including personal information about the at least one user;

processing the data received from the at least one user and generating a target data string therefrom;

sending a representation of the target data string to the at least one user, enabling the at least one user to modify the target data string;

receiving from the at least one user the modified target data string; and storing the modified data string in the structured database.

30. The method of claim 29, wherein the representation of the target data string is a structured form.

31. The method of claim 30, wherein the structured form includes multiple fields, and wherein at least one of the multiple fields is capable of accommodating the target data string.

32. The method of claim 29, wherein the step of processing generates multiple target data strings.

33. The method of claim 32, wherein the step of sending includes a step of sending a structured form that includes multiple fields, each of which are capable of accepting a data string and which have target data strings inserted therein.

34. The method of claim 33, wherein the step of receiving from the at least one user the modified target data string includes a step of receiving at least one additional target data string in addition to the modified target data string, and wherein the step of storing includes a step of storing the at least one additional target data string and the modified target data string in the structured database.

35. The method of claim 29, wherein the sending and receiving steps use a remote communication interface.

36. The method of claim 29, wherein the remote communication interface uses the internet.

* * * * *